UNITED STATES PATENT OFFICE.

HERMANN THOMS, OF BERLIN, GERMANY, ASSIGNOR TO LUDWIG FRIEDRICH RIEDEL, OF SAME PLACE.

SALICYLATE OF TOLYLDIMETHYLPYRAZOLON.

SPECIFICATION forming part of Letters Patent No. 509,055, dated November 21, 1893.

Application filed July 26, 1893. Serial No. 481,535. (Specimens.)

*To all whom it may concern:*

Be it known that I, HERMANN THOMS, a subject of the Emperor of Germany, residing at Berlin, in the German Empire, have found that under certain conditions the ortho-tolyldimethylpyrazolon ($C_{12}H_{14}N_2O$) will easily combine with salicylic acid to form a crystalline salicylate ($C_{12}H_{14}N_2O.C_7H_6O_3$), which has a remarkable therapeutic value and constitutes a decided addition to my stock of medicines. For producing this salicylate of ortho-tolyldimethylpyrazolon, the ortho-tolyldimethylpyrazolon is first prepared, by mixing aceto-acetic ether ($C_6H_{10}O_3$), with ortho-tolylhydrazin, ($C_7H_7N_2H_3$,) in proportions corresponding to their molecular weights, which operation is attended with a rise of temperature, separation of water, and condensation to a body $C_{13}H_{18}N_2O_2$. After the water has been removed, this body is heated on the water bath, for about three hours, thereby separating out alcohol, and causing it to yield the ortho-tolylmethylpyrazolon, ($C_{11}H_{12}N_2O$) in the shape of crystals melting at 152° centigrade. The latter when heated with equimolecular quantities of methyl-iodide and methyl-alcohol, in a closed retort, at a temperature between 100° and 120° centigrade, for about five hours, is readily converted into ortho-tolyldimethylpyrazolon, ($C_{12}H_{14}N_2O$,) while replacing one atom of hydrogen by methyl, ($CH_3$.) Any methyl-iodide and methyl-alcohol which has not taken part in the reaction, is then separated from the product by distillation. When crystallized from acetic ether, the ortho-tolyldimethylpyrazolon melts at about 96° centigrade. For preparing the salicylate of ortho-tolyldimethylpyrazolon, which constitutes the subject of the present invention, six kilograms of the ortho-tolyldimethylpyrazolon and four kilograms of salicylic acid are melted together over a water bath, and the resulting salt is recrystallized from acetic ether or alcohol. The salicylate of ortho-tolyldimethylpyrazolon, ($C_{12}H_{14}N_2O.C_7H_6O_3$,) thus obtained forms tough crystals which melt at 100.5° centigrade, and are sparingly soluble in water, but easily soluble in alcohol, ether and acetic ether. Strong bases decompose it by splitting off ortho-tolyldimethylpyrazolon and forming a salicylate of the stronger base. As mentioned above, the salicylate of ortho-tolyldimethylpyrazolon which may be prepared as described, and constitutes a new derivative of ortho-tolyldimethylpyrazolon, possesses valuable therapeutic properties, in consequence of which it is suitable for medicinal use and as an antiseptic for technical purposes. As a medicinal agent for muscular rheumatic affections, particularly for acute muscular rheumatism, doses of from three to six grams every half hour or every hour can be administered with great beneficial results.

Having thus described my invention, what I claim as new therein, and desire to secure by Letters Patent, is—

1. As a new chemical product, the salicylate of ortho-tolyldimethylpyrazolon $C_{12}H_{14}N_2O.C_7H_6O_3$, which forms crystals melting at 100.5°, is sparingly soluble in water, but easily soluble in alcohol, ether and acetic ether, and which yields ortho-tolyldimethylpyrazolon, when brought together with strong alkalies, substantially as described.

2. The process of obtaining salicylate of orthotolyldimethyl pyrazolon, which consists in melting together equimolecular proportions of salicylic acid and orthotolyldimethyl pyrazolon.

3. The process of obtaining salicylate of orthotolyldimethyl pyrazolon which consists in heating together aceto-acetic ether and orthotolylhydrazin, methylating the ortho-tolylmethyl pyrazolon thus obtained, and combining therewith salicylic acid, substantially as described.

HERMANN THOMS.

Witnesses:
FRIEDR. RIEDEL,
MARC FUCHS.